UNITED STATES PATENT OFFICE.

CARL AUGUST CASPERSSON, OF FORSBACKA, MARZRETCHILL, SWEDEN.

DETERMINING THE TEMPER OF IRON OR STEEL.

SPECIFICATION forming part of Letters Patent No. 404,600, dated June 4, 1889.

Application filed February 12, 1889. Serial No. 299,649. (No model.)

*To all whom it may concern:*

Be it known that I, CARL AUGUST CASPERSSON, engineer, a subject of the King of Sweden, and a resident of Forsbacka, Marzretchill, Sweden, have invented certain Improvements in Determining the Temper of Iron or Steel, of which the following is a specification.

As the temper of iron or steel, as is well known, not only depends on the per cent. of carbon, but also on the per cent. of other substances met with in common iron or steel—as silicium, manganese, phosphorus, &c.—at iron and steel works they have been obliged to determine the temper by forging-tests. These tests require, however, for the higher temper at least, great skill and many years of practice.

The object of the present invention is a method of testing which would render these difficult forging-tests unnecessary. It is founded on the fact that if an electric current is sent through a bar of iron or steel of a certain cross-section the higher its temper the quicker is the bar melted off, notwithstanding what the substances may be that are in the iron and cause the temper.

The test can be made either by comparing the effect of the electric current on the metal that is to be tested, and on other iron or steel of a known temper, or by measuring the strength of the current requisite to melt off the metal which is to be tested and thence calculating the temper.

To carry out the method of testing according to the first manner, so-called "normal steel" of known temper is procured, as much as desirable and necessary to carry out the tests, and from this normal steel by forging or rolling or drawing suitable-sized normal pieces are made, the minimum cross-section of which is to be alike in all. When a test is to be made, one or more test-pieces are taken of the iron or steel in question and wrought in like manner as the normal steel, and given a minimum cross-section which is like unto that of the normal-steel pieces. The test-piece and one of the normal-steel pieces the temper of which is considered as nearest the test-piece are then inserted in an electric circuit from a dynamo-machine or other source of electricity and the current turned on. Both the test-piece and the normal-steel piece then become heated, and the harder is most heated and melts off if the current is allowed to continue long enough. By repeating such comparing tests with pieces of normal steel of different temper the temper of the metal which is to be tested can be determined with sufficient accuracy and in a very short time. The test can also be made by placing several normal-steel pieces of different temper, together with the test-piece, in the electric circuit, the current then being turned on until the hardest of the pieces melts off. This piece is then removed and the circuit closed, then the current again turned on, when the piece next in temper melts off, &c. This process is repeated until the test-piece itself melts off, when it is ascertained that its temper lies between that of the normal-steel piece which had just before melted off and that of the normal-steel piece next in temper which has not melted off. To gain time, and also to economize the pieces of normal steel, the last-mentioned test may be modified so far that the current be regulated from the commencement of the test, so that none of the pieces are allowed to melt off, but the current be only permitted to continue until the hardest pieces are of a more or less red or brown color, after which all those pieces are uncoupled which are of a lighter color than the test-piece, and the test then proceeded with as described above.

To accomplish the testing according to the second manner, the strength of the current requisite for the melting off of pieces of normal steel of equal minimum cross-section and of different temper must be first determined by an amperometer and a scale made up. A test-piece of the iron or steel to be tested is then made of the same minimum cross-section as the before-mentioned pieces of normal steel. This test-piece is, together with an amperometer, inserted in an electric circuit. The current is then turned on until the sample or test-piece melts off and the position of the amperometer observed at the melting moment. By means of the scale previously made the temper can then easily be determined.

I claim—

A method of determining the temper of iron or steel, consisting in conducting an electric current through a sample or test-piece of the iron or steel the temper of which is to be determined, melting it off, and comparing the intensity of the current requisite with the strength of the current required to melt off pieces of normal steel of the same minimum cross-section as the sample and of known temper, either directly by placing the above-mentioned normal pieces in the same electric circuit or indirectly by the aid of an amperometer, substantially as described.

In testimony whereof I have signed my name to this specification in the presence of two subscribing witnesses.

CARL AUGUST CASPERSSON.

Witnesses:
FREDRIK L. ENQUIST,
AUG. MALMBERG,
*Both of Stockholm.*